US012515917B2

(12) United States Patent
Wei

(10) Patent No.: US 12,515,917 B2
(45) Date of Patent: Jan. 6, 2026

(54) ELEVATOR DOOR INTERFACE MONITOR

(71) Applicant: OTIS ELEVATOR COMPANY, Farmington, CT (US)

(72) Inventor: Wei Wei, Unionville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1312 days.

(21) Appl. No.: 17/221,883

(22) Filed: Apr. 5, 2021

(65) Prior Publication Data

US 2022/0315382 A1 Oct. 6, 2022

(51) Int. Cl.

| | |
|---|---|
| ***B66B 5/00*** | (2006.01) |
| ***B66B 1/36*** | (2006.01) |
| ***B66B 1/46*** | (2006.01) |

(52) U.S. Cl.

CPC .............. *B66B 5/0031* (2013.01); *B66B 1/36* (2013.01); *B66B 1/461* (2013.01)

(58) Field of Classification Search

CPC .......... B66B 5/0031; B66B 1/36; B66B 1/461
USPC .......................................................... 187/391
See application file for complete search history.

(56) References Cited

FOREIGN PATENT DOCUMENTS

| | | | |
|---|---|---|---|
| DE | 202014005758 U1 * | 9/2014 | ............. B66B 13/28 |
| KR | 101929838 B1 * | 12/2018 | |

* cited by examiner

*Primary Examiner* — Jianchun Qin

(74) *Attorney, Agent, or Firm* — Carlson, Gaskey & Old, s P.C.

(57) ABSTRACT

An illustrative example embodiment of an elevator door interface monitor includes at least one hook having a portion that is configured to be situated across the interface and moveable responsive to contact with an item situated at least partially in the interface. An indicator provides an indication of an item in the interface based on movement of the hook responsive to contact with the item.

20 Claims, 4 Drawing Sheets

ELEVATOR DOOR INTERFACE MONITOR

BACKGROUND

Elevator cars include a cab that accommodates passengers as the elevator carries the passengers between different levels of a building. Typical cabs include doors that selectively open when the car is at a landing where a passenger wants to board or exit the car. Typical door systems include a sensor, such as a light curtain or mechanical switch, that detects when an individual or an object is between the doors and in the pathway of door movement as the doors would close. Such sensors operate to prevent the doors from closing under appropriate conditions. As long as the doors remain open, the elevator car will not leave the landing.

Even with existing door sensors, it may be possible for a relatively small item, such as a strap, to be situated on the sill or otherwise across the doorway without being detected by the sensor. In some circumstances, the doors may close on the item. If the doors are able to fully close, the elevator car will be able to move from the landing even though it is desirable or important to limit or avoid movement of the car away from the landing.

SUMMARY

An illustrative example embodiment of an elevator door interface monitor includes at least one hook having a portion that is configured to be situated across the interface and moveable responsive to contact with an item situated at least partially in the interface. An indicator provides an indication of an item in the interface based on movement of the hook responsive to contact with the item.

In addition to one or more of the features described above, or as an alternative, the indicator comprises a switch that is activated responsive to the movement of the hook.

In addition to one or more of the features described above, or as an alternative, activation of the switch results in a signal to prevent elevator car movement.

In addition to one or more of the features described above, or as an alternative, the at least one hook comprises at least two hooks. A first one of the two hooks is situated to contact the item during downward elevator car movement and a second one of the two hooks is situated to contact the item during upward elevator car movement.

In addition to one or more of the features described above, or as an alternative, the elevator door interface monitor of any of the previous paragraphs includes a link connected with the first and second hooks for coordinated movement of the two hooks. The coordinated movement includes movement responsive to either of the two hooks contacting the item and movement of the two hooks into a retracted position corresponding to an open door position.

In addition to one or more of the features described above, or as an alternative, the first hook moves about a first pivot, the second hook moves about a second pivot, the first pivot is on a first side of the link, the second pivot is on a second opposite side of the link, and a first direction of movement of the first hook is opposite from a second direction of movement of the second hook during the coordinated movement.

In addition to one or more of the features described above, or as an alternative, the interface has a top near a top of an associated elevator door and a bottom near a bottom of the associated elevator door, the first hook is closer to the top of the interface than the second hook, and the second hook is closer to the bottom of the interface than the first hook.

In addition to one or more of the features described above, or as an alternative, the at least one hook is moveable between a detecting position where the portion of the hook is situated across the interface and a retracted position where the portion of the hook can be hidden within an associated elevator door that is in an open position.

In addition to one or more of the features described above, or as an alternative, the elevator door interface monitor of any of the previous paragraphs includes a biasing mechanism that biases the at least one hook into the retracted position.

In addition to one or more of the features described above, or as an alternative, the portion of the at least one hook includes a blade configured to sever an item that contacts the hook during movement of an associated elevator car.

In addition to one or more of the features described above, or as an alternative, an illustrative example embodiment of an elevator car includes the elevator door interface monitor of any of the previous paragraphs, an elevator car door having an edge situated along one side of the interface when the elevator car door is closed, a door mover assembly that moves the at least one elevator car door between open and closed positions, and a link coupling the at least one hook with a portion of the door mover to move the at least one hook into a retracted position as the door mover assembly moves the elevator car door toward the open position and to move the at least one hook into a detecting position where the portion of the hook is across the interface as the door mover assembly moves the elevator car door into the closed position.

An illustrative example embodiment of a method of monitoring an elevator door interface includes situating a portion of at least one hook across the interface, moving at least the portion of the at least one hook responsive to contact with an item situated at least partially in the interface, and providing an indication of the item in the interface based on movement of the hook responsive to contact with the item.

In addition to one or more of the features described above, or as an alternative, providing the indication comprises activating a switch responsive to the movement of the hook.

In addition to one or more of the features described above, or as an alternative, activating the switch comprises generating a signal to prevent elevator car movement.

In addition to one or more of the features described above, or as an alternative, the at least one hook comprises at least two hooks. A first one of the two hooks is situated to contact the item during downward elevator car movement and a second one of the two hooks is situated to contact the item during upward elevator car movement.

In addition to one or more of the features described above, or as an alternative, the method includes coordinating movement of the two hooks including moving both of the two hooks responsive to either of the two hooks contacting the item.

In addition to one or more of the features described above, or as an alternative, coordinating the movement includes moving the first hook in a first direction while moving the second hook in a second direction that is opposite from the first direction.

In addition to one or more of the features described above, or as an alternative, coordinating the movement includes moving the two hooks between a detecting position where the respective portions of the hooks are situated across the interface and a retracted position where the respective portions of the hooks can be hidden within an associated elevator door that is an open position.

In addition to one or more of the features described above, or as an alternative, the method includes biasing the two hooks into the retracted position.

In addition to one or more of the features described above, or as an alternative, the portion of the at least one hook includes a blade configured to sever an item that contacts the hook during movement of an associated elevator car.

The various features and advantages of at least one disclosed example embodiment will become apparent to those skilled in the art from the following detailed description. The drawings that accompany the detailed description can be briefly described as follows.

DETAILED DESCRIPTION

Figure 1:
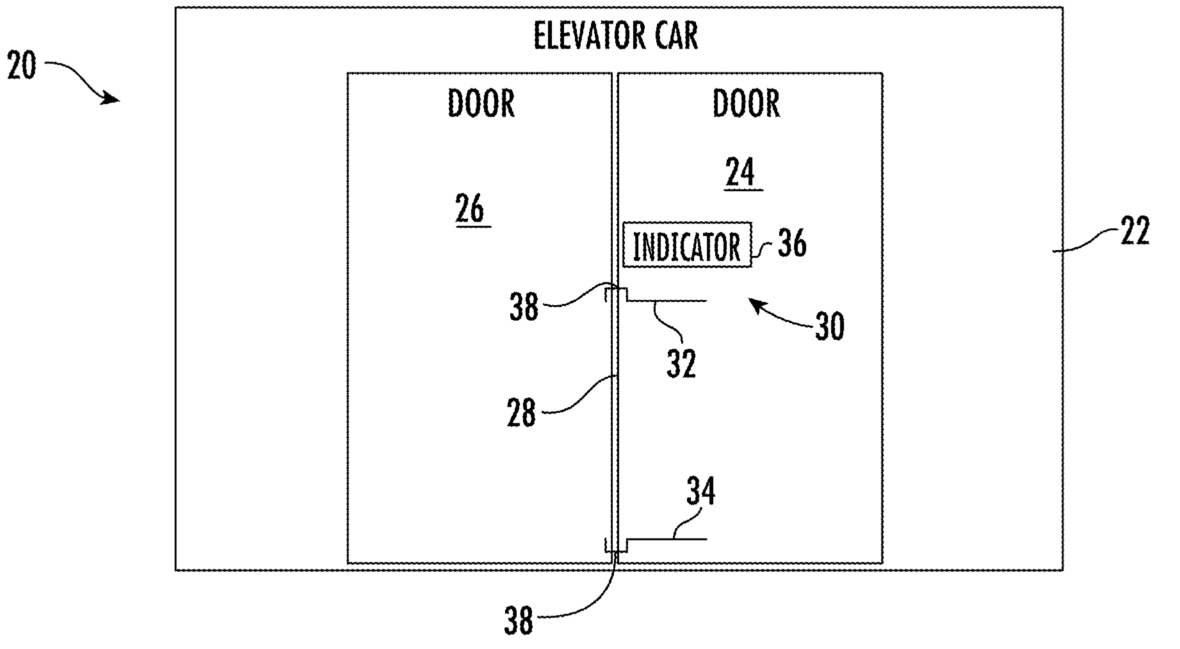
FIG. 1 schematically illustrates selected portions of an example embodiment of an elevator car including closed doors and a door interface monitor.

FIG. 1 schematically illustrates selected portions of an elevator car 20. A cab 22 includes elevator car doors 24 and 26. When the doors 24, 26 are closed as shown in FIG. 1, edges of the doors 24, 26 are positioned very close to each other or touch at an interface 28. While the illustrated example embodiment includes two moving doors 24, 26, some elevator cabs have only one moving door and the interface 28 exists between an edge of the door and a door jamb.

An elevator door interface monitor 30 includes at least one hook 32, 34 and an indicator 36. The illustrated example embodiment includes a first hook 32 and a second hook 34. Each hook 32, 34 includes a portion 38 that is configured to be situated across the interface 28 where the portion 38 can contact an item situated in the interface 28. At least the portion 38 of the hooks 32, 34 is moveable in response to contact with an item in the interface 28. The indicator 36 provides an indication of an item caught in the interface in response to movement of at least one of the hooks 32, 34 which results from contact with an item in the interface 28. The indication from the indicator 36 may be used as a signal to prevent further movement of the elevator car 20. In some embodiments, the elevator car will stop in response to the indication from the indicator 36 and return to the location or landing where the doors 24 and 26 closed prior to the indication from the indicator 36.

Figure 2:
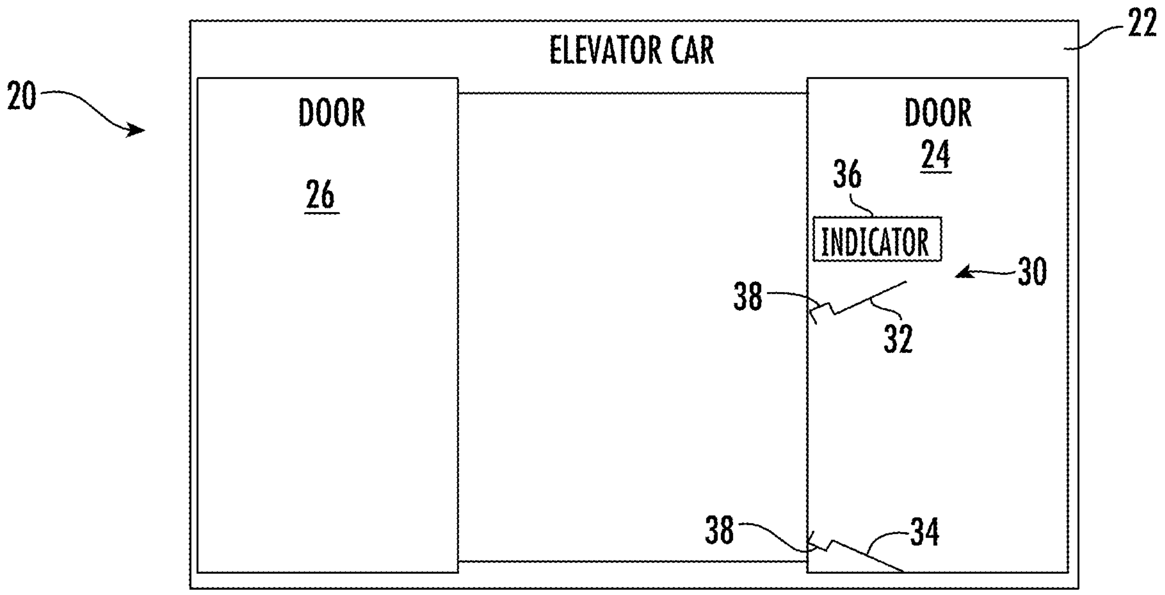
FIG. 2 schematically illustrates selected portions of the elevator car of FIG. 1 with the doors open.

The hooks 32 and 34 in the illustrated example embodiment are moveable between a detecting position shown in FIG. 1 when the doors 24, 26 are closed and a retracted position shown in FIG. 2 when the doors 24, 26 are open. In the retracted position, the hooks 32, 34 are hidden within the space between the elevator car door 24 and an adjacent hoistway door to which the elevator car door 24 is coupled. This feature avoids any contact with the hooks 32, 34 as passengers or items cross the threshold between the interior 40 of the elevator cab 22 and an adjacent landing.

Figure 3:
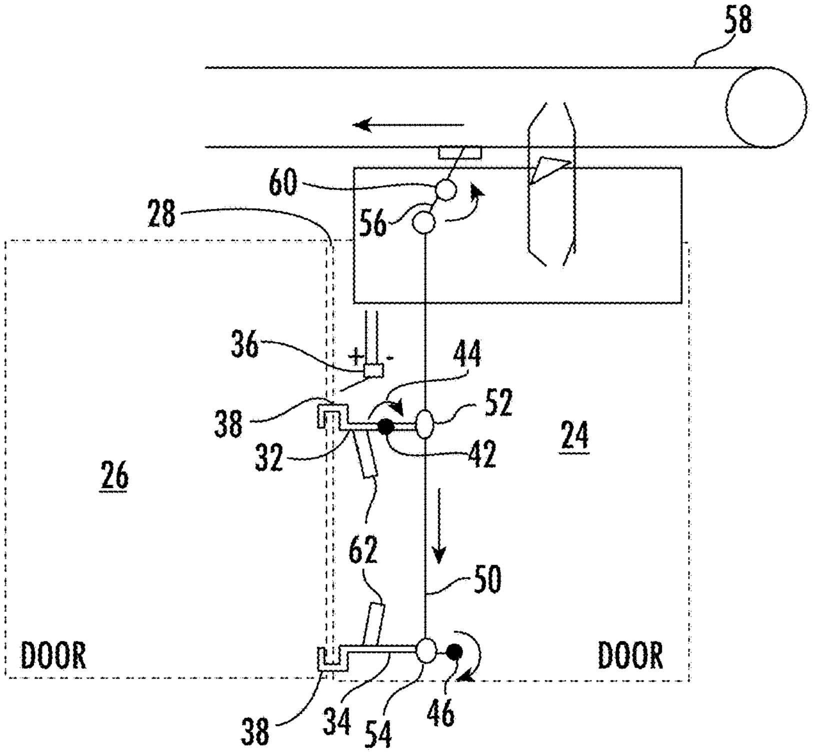
FIG. 3 schematically illustrates an example embodiment of a door interface monitor.

FIG. 3 schematically shows more details of an example configuration of the elevator door interface monitor 30. In this example, the first hook 32 is moveable about a first pivot 42 as schematically shown by the arrow 44. The second hook 34 is moveable about a second pivot 46.

A link 50 connects the first hook 32 and the second hook 34 and establishes a connection between the books 32 and 34 for coordinated movement of the hooks 32 and 34. The link 50 is rigid and, in some embodiments, comprises a rod. The link 50 is connected to the first hook 32 at a first connection 52. The link 50 is connected to the second hook 34 at a second connection 54. In the illustrated example embodiment, the first pivot 42 is on a first side of the link 50 (to the right of the link according to the drawing) and the second pivot 46 is on an opposite side of the link 50 (to the left of the link according to the drawing). The rigidity of the link 50 and the relative positions of the first connection 52, the first pivot 42, the second connection 54 and the second pivot 46 coordinates movement of the hooks 32 and 34.

In this embodiment, if the link 50 moves up, the first hook 32 pivots about the first pivot 42 in a counterclockwise direction and the second hook 34 pivots about the second pivot 46 in a clockwise direction. If the link 50 moves down, the first hook 32 pivots about the first pivot 42 in a clockwise direction and the second hook 34 pivots about the second pivot 46 in a counterclockwise direction. The hooks 32 and 34 move simultaneously in opposite directions because the first and second pivots 42 and 46, respectively, are on opposite sides of the link 50.

A coupling 56 couples the link 50 to a door mover assembly 58, which includes a motor and a belt in the illustrated example. As the door mover assembly 58 causes movement of the doors into a closed position as shown in FIG. 3, the portion of the coupling 56 coupled to the belt is urged toward the interface 28 (to the left in the drawing) as the doors 24 and 26 reach the fully closed position. As that portion of the coupling 56 is urged toward the interface 28, the coupling 56 pivots about the pivot 60 and the link 50 is urged or pushed downward and the hooks 32 and 34 pivot or rotate into the detection position with the portions 38 situated across the interface 28.

As the door mover assembly 58 moves the doors 24, 26 away from each other toward an open position, the coupling 56 is urged in an opposite direction and the link 50 is urged or pulled upward. As the link 50 moves up, the first hook 32 rotates in a counterclockwise direction into the retracted position and the second hook 34 rotates in a clockwise direction into its retracted position. The example embodiment of FIG. 3 includes a biasing mechanism 62, such as a spring, that urges the hooks 32, 34 into the retracted position. In the illustrated example, each of the hooks 32, 34 has an associated biasing mechanism 62. In other embodiments, the biasing mechanism 62 acts directly on the link 50 or the coupling 56 to urge the hooks 32, 34 into the retracted position.

Example items that might be situated in the interface 28 when the doors 24, 26 are closed include a pet leash, a shoelace, or a strap. Even though such an item is in the interface 28, the doors 24, 26 may completely close so that the elevator car 20 may move along a hoistway (not illustrated). In some situations, it will be possible to pull such an item from the interface while the doors 24, 26 are closed. In other situations, however, such an item might be trapped in the interface 28 until the doors 24, 26 open. As the elevator car 20 moves from the landing, the trapped item will encounter one of the hooks 32, 34 and cause that hook to move in a way that will activate the indicator 36.

Figure 4A:
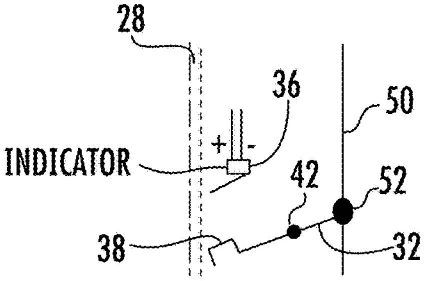
FIGS. 4A-4C schematically illustrates selected portions of the example embodiment of the door interface monitor in different conditions, respectively.
Figure 4B:
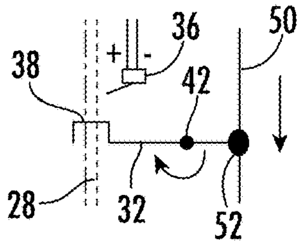
Figure 4C:
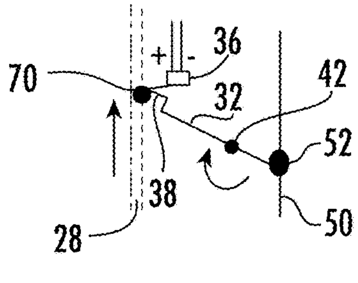

FIGS. 4A-4C schematically illustrate a situation in which an item becomes trapped in the interface 28 with one end in the elevator cab 22 and another at the landing outside the elevator cab 22. While the doors 24, 26 are open, the first hook 32 is in the retracted position shown in FIG. 4A. As the elevator door 24 reaches the closed position, the first hook 32 moves into the detection position shown in FIG. 4B.

FIG. 4C illustrates a scenario in which the elevator car 20 descends after the doors 24, 26 are closed. An item 70 that is trapped in the interface will effectively be pulled up along the interface 28 because one end is in the cab 22 and the other is at the landing. As the item 70 effectively moves up along the interface 28, the item 70 eventually contacts the first hook 32. Continued downward movement of the elevator car 20 causes continued upward relative movement of the item 70 pulling the portion 38 of the first hook upward until the first hook 32 activates the indicator 36.

In the illustrated example embodiment, the indicator 36 includes a switch that is activated based on contact with the first hook 32. The indication from the indicator 36 is received and interpreted by an elevator control (not illustrated) as a signal or command to stop the elevator car 20. The elevator control in this embodiment causes the elevator car 20 to return to the landing that it just departed from and the door mover assembly 58 causes the doors 24, 26 to open. The trapped item 70 can then be removed from the interface 28.

Figure 5:
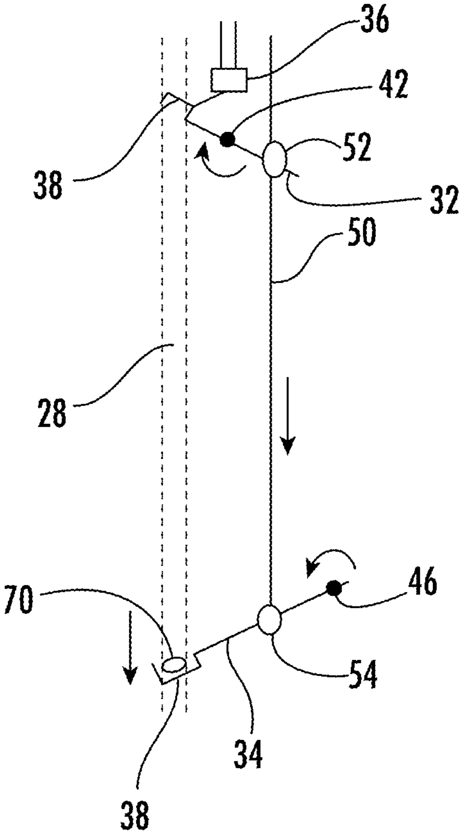
FIG. 5 schematically illustrates selected portions of the example embodiment of the door interface monitor in another condition.

FIG. 5 illustrates a scenario in which the elevator car 20 ascends from the landing where the item 70 became trapped in the interface 28. As the car 20 moves upward, the item 70 is effectively pulled downward along the interface until it contacts the second hook 34 and urges the portion 38 downward. The second hook 34 pivots about the second pivot 46 in a counterclockwise direction. The link 50 is urged upward and the first hook 32 moves in a clockwise direction until the first hook 32 contacts the switch of the indicator 36 and activates the switch.

The coordinated movement of the first hook 32 and the second hook 34 ensures that contact between either hook 32, 34 and an item 70 trapped in the interface will result in activating the indicator 36 to stop the elevator car 20. The interface 28 extends along the edge of the door 24 between the top and the bottom of the door 24. The first hook 32 is closer to the top of the door 24 and the top of the interface 28 than the second hook 34, which is closer to the bottom than the first hook 32. Having the hooks 32, 34 situated as illustrated provides an ability to detect an item within the interface 28 regardless of which direction the elevator car 20 travels as the car 20 departs from the landing where the item became trapped in the interface 28.

Figure 6:
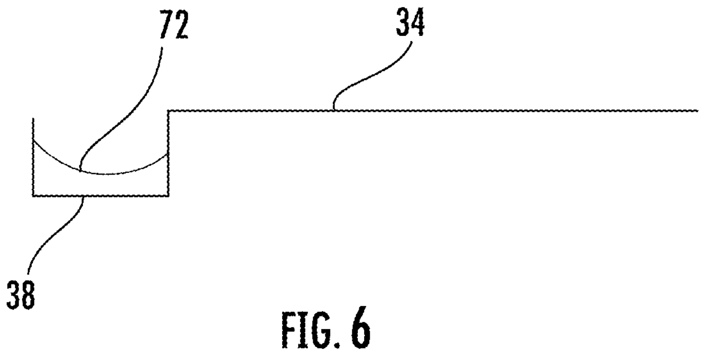
FIG. 6 schematically illustrates a feature of an example embodiment of a hook used in a door interface monitor.

FIG. 6 illustrates a feature of an example embodiment. A blade 72 within or attached to the portion 38 is configured to sever a trapped item as the item is urged into contact with the hook during movement of the elevator car 20. The second hook 34 is shown in FIG. 6 as an example. The first hook 32 in some embodiments includes a blade 72 facing downward to sever an item that contacts the first hook 32 during movement of the elevator car.

Figure 7:
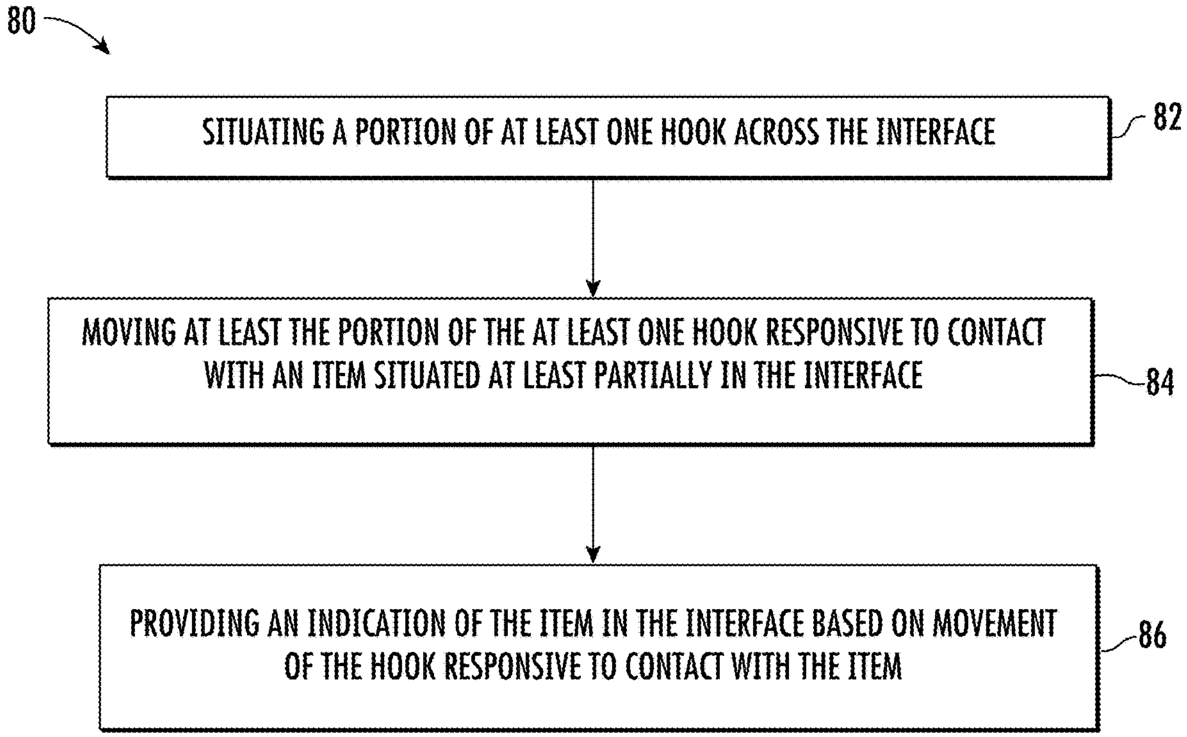
FIG. 7 is a flow chart diagram summarizing an example method of monitoring an elevator door interface.

FIG. 7 is a flow chart diagram 80 that summarizes an example method of monitoring an elevator door interface, such as the interface 28. The method includes situating a portion 38 of at least one hook 32, 34 across the interface 28 at 82. The step represented at 84 includes moving at least the portion of the at least one hook 32, 34 responsive to contact with an item situated at least partially in the interface 28. At 86, the indicator 36 provides an indication of the item in the interface 28 based on the movement of at least the portion 38 of the hook 32, 34 responsive to contact with the item.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator door interface monitor, comprising:

at least a first hook and a second hook each having a portion that is configured to be situated across an interface and moveable responsive to contact with an item situated at least partially in the interface, and wherein the first hook moves about a first pivot and the second hook moves about a second pivot;

a rigid link having a first portion connected to the first look at a first connection and a second portion connected to the second hook at a second connection, and wherein the first pivot is on a first side of the rigid link and the second pivot is on a second opposite side of the field link; and an indicator for each of the first hook and the second hook that provides an indication of an item in the interface based on movement of the first hook or second hook responsive to contact with the item.

2. The elevator door interface monitor of claim 1, wherein the indicator comprises a switch that is activated responsive to the movement of the first hook of the second hook.

3. The elevator door interface monitor of claim 2, wherein activation of the switch results in a signal to prevent elevator car movement.

4. The elevator door interface monitor of claim 1, wherein:

one of the first hook and the second hook is situated to contact the item during downward elevator car movement, and the other of the first hook and the second hook is situated to contact the item during upward elevator car movement.

5. The elevator door interface monitor of claim 4, wherein the rigid link provides coordinated movement of the first hook and the second hook and wherein coordinated movement includes:

movement responsive to either of the first hook and the second hook contacting the item;

movement of the first hook and the second hook into a retracted position corresponding to an open door position; and a first direction of movement of the first hook is opposite from a second direction of movement of the second hook during the coordinated movement.

6. The elevator door interface monitor of claim 1, wherein each of the first hook and the second hook is moveable between a detecting position where the portion of the first hook of the second hook is situated across the interface and a retracted position where the portion of the first hook of the second hook can be hidden within an associated elevator door that is in an open position.

7. The elevator door interface monitor of claim 6, comprising a biasing mechanism that biases the first hook and the second hook into the retracted position.

8. The elevator door interface monitor of claim 1, wherein the portion of the first hook or second hook includes a blade configured to sever an item that contacts the first hook or second hook during movement of an associated elevator car.

9. An elevator car, comprising:

the elevator door interface monitor of claim 1;

at least one elevator car door having an edge situated along one side of the interface when the at least one elevator car door is closed;

a door mover assembly that moves the at least one elevator car door between open and closed positions; and an additional link coupling the rigid link with a portion of the door mover assembly to move the first hook and the second hook into a retracted position as the door mover assembly moves the at least one elevator car door toward the open position and to move the first hook and the second hook into a detecting position where the portion of the first hook the second hook is across the interface as the door mover assembly moves the at least one elevator car door into the closed position.

10. The elevator car of claim 9, wherein the additional link has one end associated with the rigid link and an opposite end associated with the door mover assembly, and wherein the additional link pivots about a third pivot located between ends of the additional link in response to movement of the door mover assembly.

11. The elevator door interface monitor of claim 1, wherein the rigid link comprises a rod.

12. A method of monitoring an elevator door interface, the method comprising:

situating a portion of at least one a first hook and a second hook across an interface, wherein the first hook moves about a first pivot and the second hook moves about a second pivot;

moving at least the portion of the first hook or the second hook responsive to contact with an item situated at least partially in the interface;

connecting a first portion of a rigid link to the first hook at a first connection and connecting a second portion of the rigid link to the second hook at a second connection, wherein first pivot is on a first side of the rigid link and the second pivot is on a second opposite side of the rigid link;

providing an indication of the item in the interface based on movement of the first hook of second hook responsive to contact with the item.

13. The method of claim 12, wherein providing the indication comprises activating a switch responsive to the movement of the first hook or the second hook.

14. The method of claim 13, wherein activating the switch comprises generating a signal to prevent elevator car movement.

15. The method of claim 12, wherein;

one of the first hook and the second hook is situated to contact the item during downward elevator car movement, and the other of the first hook and the seco a hook is situated to contact the item during upward elevator car movement.

16. The method of claim 15, comprising using the rigid link to coordinate movement of the first hook and the second hook including moving both of the first hook and the second hook responsive to either of the first hook and the second hook contacting the item.

17. The method of claim 16, wherein coordinating the movement includes moving the first hook in a first direction while moving the second hook in a second direction that is opposite from the first direction.

18. The method of claim 16, wherein coordinating the movement includes moving the first hook and the second hook between a detecting position where respective portions of the first hook and the second hook are situated across the interface and a retracted position where the respective portions of the first hook and the second hook can be hidden within an associated elevator door that is an open position.

19. The method of claim 18, comprising biasing the first hook and the second hook into the retracted position.

20. The method of claim 12, coupling the rigid link to a portion of a door mover assembly with an additional link to move the first hook and the second hook into a retracted position as the door mover assembly moves at least one elevator car door toward an open position and to move the first hook and the second hook into a detecting position where the portion of the first hook and the second hook is across the interface as the door mover assembly moves the at least one elevator car door into a closed position, and including pivoting the additional link about a third pivot located between ends of the additional link in response to movement of the door mover assembly.

* * * * *